US010780759B1

(12) United States Patent
Houston

(10) Patent No.: US 10,780,759 B1
(45) Date of Patent: Sep. 22, 2020

(54) SULKY APPARATUS WITH SUSPENSION SYSTEM

(71) Applicant: Steve R. Houston, Myersville, MD (US)

(72) Inventor: Steve R. Houston, Myersville, MD (US)

( * ) Notice: Subject to any disclaimer, the term of this patent is extended or adjusted under 35 U.S.C. 154(b) by 0 days.

(21) Appl. No.: 16/445,895

(22) Filed: Jun. 19, 2019

(51) Int. Cl.
| *A01D 34/00* | (2006.01) |
| *B60G 17/0165* | (2006.01) |
| *A01D 34/82* | (2006.01) |
| *A01D 101/00* | (2006.01) |

(52) U.S. Cl.
CPC ......... *B60G 17/0165* (2013.01); *A01D 34/82* (2013.01); *A01D 2101/00* (2013.01); *B60G 2204/124* (2013.01); *B60G 2300/08* (2013.01)

(58) Field of Classification Search
CPC .... A01D 34/026; A01D 34/82; A01D 34/001; A01D 34/003
See application file for complete search history.

(56) References Cited

U.S. PATENT DOCUMENTS

| 4,828,282 A * | 5/1989 | Pinto | A01D 34/001 |
| | | | 280/32.7 |
| 9,167,748 B1 * | 10/2015 | Houston | A01D 34/001 |
| 9,661,802 B1 * | 5/2017 | Seliga | A01D 34/003 |
| 9,883,629 B2 * | 2/2018 | Smith | A01B 45/026 |
| 2009/0096178 A1 * | 4/2009 | Beal | A01D 34/82 |
| | | | 280/32.7 |
| 2011/0026055 A1 * | 2/2011 | Sato | H04N 1/00482 |
| | | | 358/1.9 |
| 2019/0166758 A1 * | 6/2019 | Phillip | A01D 34/66 |

* cited by examiner

*Primary Examiner* — Hau V Phan

(57) ABSTRACT

A sulky apparatus for use behind self-propelled operator-controlled machines is provided. The apparatus includes a riding platform on which the operator stands, configured with a suspension system for absorption of shock and reduced impact on the body of the operator. The suspension system comprises one or more compression springs and is configured for dual adjustment, wherein the operator may adjust the spring tension directly by adjusting the compression of the spring coils or select pivot points on the sulky for control over the amount of load absorbed by the spring coils. The sulky apparatus may be connected to a self-propelled, operator-controlled machine by way of a boom system that attaches to the sulky apparatus at one end and the machine at the other. The sulky apparatus provides a significant benefit to the rider by way of suspension system capable of absorbing shocks to the rider, fitted within a limited space.

5 Claims, 6 Drawing Sheets

SULKY APPARATUS WITH SUSPENSION SYSTEM

STATEMENT REGARDING FEDERALLY SPONSORED RESEARCH

The invention described herein was made without federal funding.

BACKGROUND OF THE INVENTION

Sulky apparatuses or simply "sulkies" for use with self-propelled machines such as self-propelled lawnmowers allow an operator to operate the machines much more efficiently than was possible prior to the existence of sulkies. Typically, a sulky includes a riding platform for the operator to stand on and some type of boom pivotally connected to the platform at one end and to the self-propelled machine at the other.

Sulkies allow much more to be accomplished by an operator that rides on a sulky riding platform in a given amount of time than an operator that walks behind a self-propelled machine. Moreover, an operator that rides on a sulky riding platform is usually much less fatigued than an operator that walks behind the self-propelled lawnmower, for example. Nevertheless, riding on a sulky riding platform can be tiring for the operator and can expose the operator to shocks resulting from riding the platform over uneven or bumpy terrain. This is particularly true in cases where the sulky is connected to a lawnmower and the area that is being mowed includes hills, bumps, ditches and rough areas. These hills, bumps, ditches and rough areas, for example, cause the riding platform and the operator that is standing on it to bounce, vibrate, pitch and tip with the rough terrain. This is physically punishing to the operator that is standing on the riding platform, particularly to the legs, knees, hips, ankles and back. In extreme conditions, an operator can slip or be thrown from the riding platform.

Ideally, a sulky would include a means for absorbing shocks as described above as well as the ability to adjust the sulky to account for the size of the operator and topography of the terrain over which a connected self-propelled machine is moved. Current sulkies fail to adequately provide this functionality, which is an object of the present invention. The invention of the present disclosure provides an adjustable suspension system designed to reduce the wear on the operator's body and allow for adjustments to optimize performance of the sulky in accordance with the operator's size and weight, thus meeting a long-felt need in the art.

BRIEF SUMMARY OF THE INVENTION

The invention of the present disclosure is that of a sulky comprising a riding platform with suspension system effective for absorbing shocks associated with riding the platform over rough terrain such as might be encountered by an operator of a self-propelled lawnmower. The present disclosure describes a sulky with a riding platform comprising a suspension system that protects the operator from injury and features multiple operator adjustments for optimum performance. A suspension system of the present disclosure is designed to absorb and minimize shocks to the operator riding the sulky for a safer and more comfortable ride than would be achievable without the suspension system and reduce fatigue and wear on the body of the operator.

These and other objects of the invention will be apparent from the present disclosure of a sulky comprising a riding platform with suspension system and a sulky wheel well wherein a wheel axle is connected to the sulky. The sulky operator riding platform may be pivotally connected to a self-propelled operator-controlled machine such as a lawnmower. The suspension system provides a means for dampening vertical oscillations of the sulky comprising a shock-absorbing means of a rear portion of the riding platform. The invention also includes a means for changing the location of where the sulky operator riding platform is pivotally connected to the wheel well at the forward portion of the sulky operator riding platform, enabling the operator to adjust the amount of load to the suspension system of the riding platform. These and other advantages of the present disclosure will be appreciated by one of ordinary skill in the art.

DETAILED DESCRIPTION OF THE INVENTION

The invention of the present disclosure relates to a floating sulky apparatus ("sulky") comprising a suspension system effective for absorbing shock associated with riding a riding platform of the sulky over uneven or bumpy terrain such as that which might be encountered by a self-propelled lawnmower. The amount of load applied to the suspension system may be adjusted by the operator based on the size of the operator and the topography of the terrain over which the floating sulky is expected to travel. Prior to operation, a wheel is inserted into a wheel well of the sulky and connected thereto via axle joints to enable rotation of the wheel as the self-propelled machine to which the sulky is connected when in use moves along. Non-limiting embodiments of the sulky and components thereof are illustrated in the accompanying drawings.

Figure 1A:
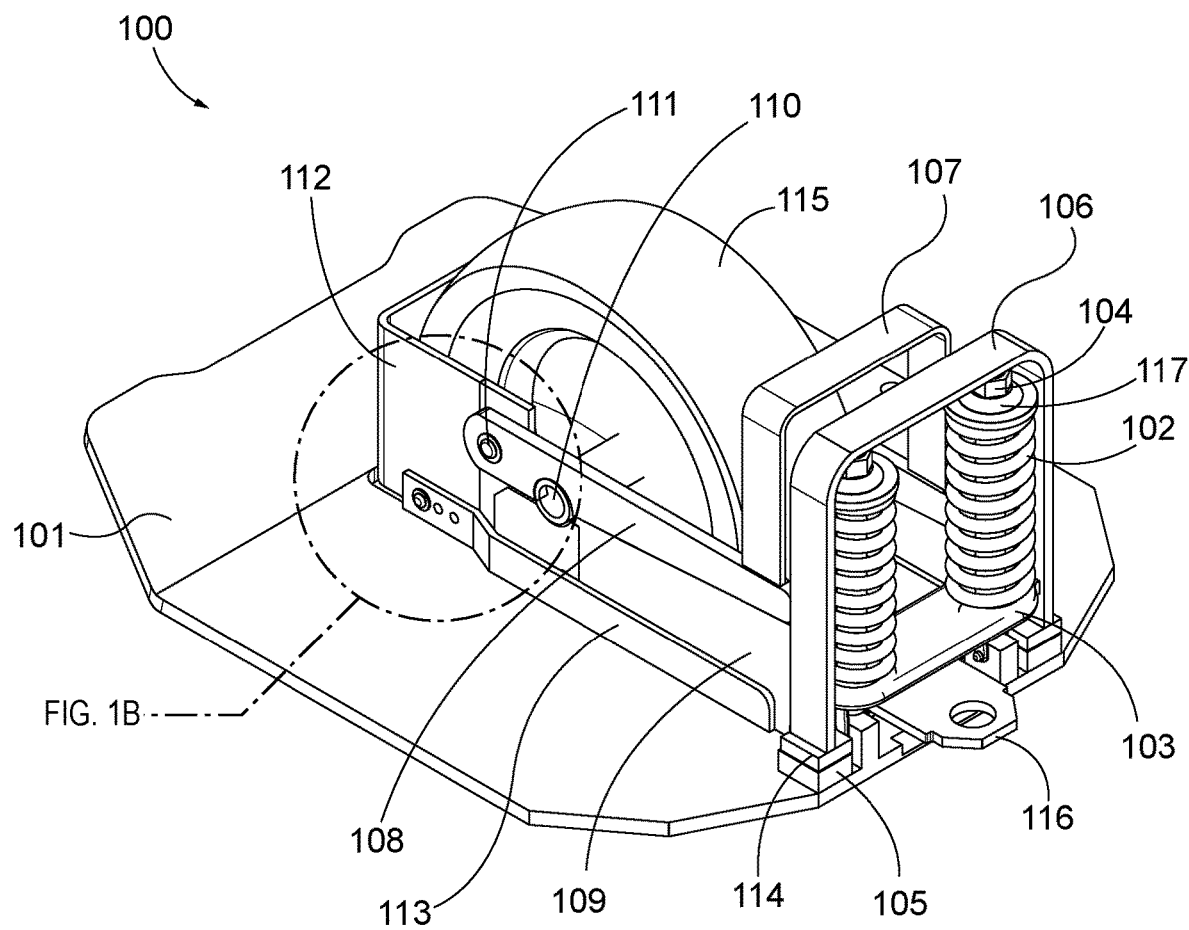
FIG. 1A illustrates a top perspective view of a sulky apparatus ("sulky") 100 of the present invention comprising a riding platform 101 and suspension system comprising one or more compression springs 102 mounted on a crossbeam support 103. The compression springs 102 each surround a spring shaft that may be adjusted by turning one or more spring nuts 104 threaded around the shaft, positioned with a washer 117 above the compression spring 102. A surrounding metal archway support 106 comprises two vertical posts each positioned atop a rubber bumper 105 with a steel bumper flange 114 positioned between each post and rubber bumper 105. A fender support 107 is provided for receiving a fender (not shown) above a wheel 115 with axle joints 110 of an axle release arm 108 connected to a wheel well 112 at axle release arm pivot points 111 of an axle release arm 108. A side support member 109 resides between an axle release arm 108 and a pivot flange 113 with pivot flange pinholes (shown in detail in FIG. 1B) for adjusting the load on the compression springs 102. An optional tarp tow 116 is provided for dragging a tarp or similar equipment behind the sulky 100.

Referring now to FIG. 1A, an embodiment of a sulky 100 of the present disclosure is illustrated in detail. The sulky 100 of FIG. 1A comprises a riding platform 101 configured with a suspension system comprising at least one compression spring 102 supported by a crossbeam support 103 beneath and held in place by at a spring nut 104 that may be threaded over a threaded upper end of a spring shaft (not shown), applying downward force over a washer 117, which in turn compresses the at least one compression spring 102 as desired by the operator.

An archway support 106 comprising two vertical posts is provided above the at least one compression spring 102, the lower portion of each vertical post being in contact with a bumper flange 114 and rubber bumper 105 for added shock absorption in addition to that provided by the at least one compression spring 102. with a suspension system useful for absorbing the shock associated with vertical oscillations of the suspension system as the sulky apparatus travels over terrain in use. A suspension system of the present invention comprises one or more compression springs 102 positioned over a crossbeam 103.

Each side of the sulky 100 is configured with a pivot flange 113 allowing for adjustment of the load to be supported by the suspension system 200 (as further detailed in FIG. 1B), which may be selected based on operator considerations such as operator size and the type of terrain over which the operator intends to propel a connected self-propelled machine. The pivot flange 113 is situated on the same vertical plane as an axle release arm 108 connected to an axle release lever 107 over which a fender (not shown) may be provided to protect the user against unintended contact of the moving wheel 115 with other parts of the sulky 100 or projectiles exiting the wheel well 112 as a connected self-propelled machine moves along. A tarp tow 116 is optionally provided for connection to a tarp or other draggable apparatus to be pulled behind the sulky 100 as a connected self-propelled machine is advanced.

Figure 1B:
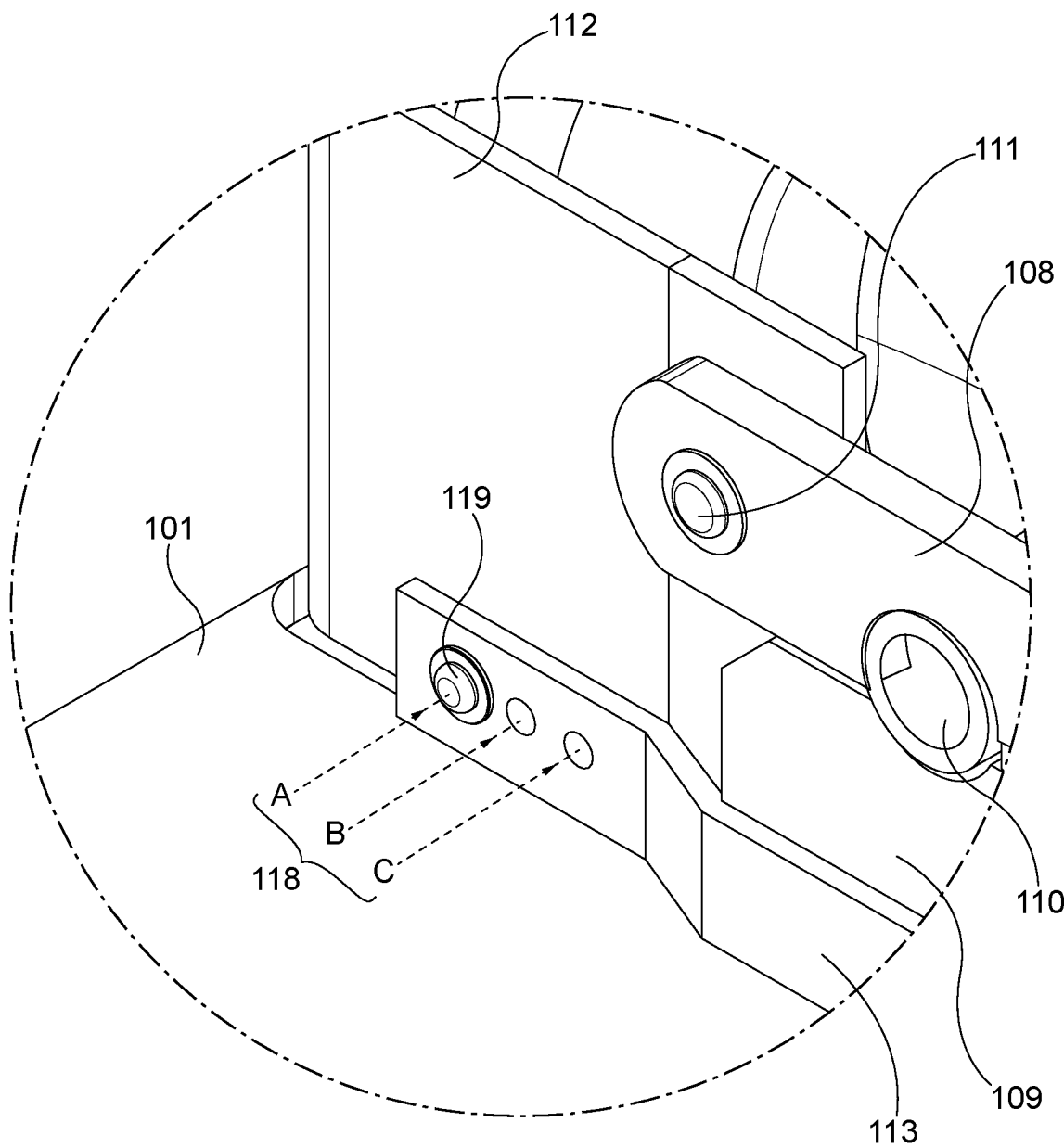
FIG. 1B provides an exploded view of pivot flange 113 with pivot flange pinholes 118A, B and C into which a pivot flange pin 119 may be inserted, each pivot flange pinhole A, B and C extending into a wheel well pinhole (not shown) such that a pivot flange pin 119 may be inserted through the pivot flange 113 and wheel well 112 and secured in place with a cotter pin or the like (not shown), enabling the operator to select a minimum, intermediate and maximum operator load on the compression springs 102. Also shown are a riding platform 101, wheel well 112, pivot point 111, axle release arm 108, axle joint 110 and side support member 109.

Turning now to FIG. 1B, a pivot flange pin 119 may be inserted into one of three pivot flange pinholes 118A, B and C in order to control the load to the suspension system of the sulky of the embodiment shown. The pivot flange pin 119 is inserted through a selected pivot flange pinhole 118 A, B or C, which extends through the wheel well 112 via a wheel well pinhole (not shown). A pivot flange pin 119 may then be secured in place by a cotter pin or equivalent securement means supplied inside the wheel well 112. One of ordinary skill in the art will appreciate that fewer or more pivot flange pinholes 118 may be employed depending on the desired level of adjustability of a pivot flange 113 of the present invention.

Figure 2:
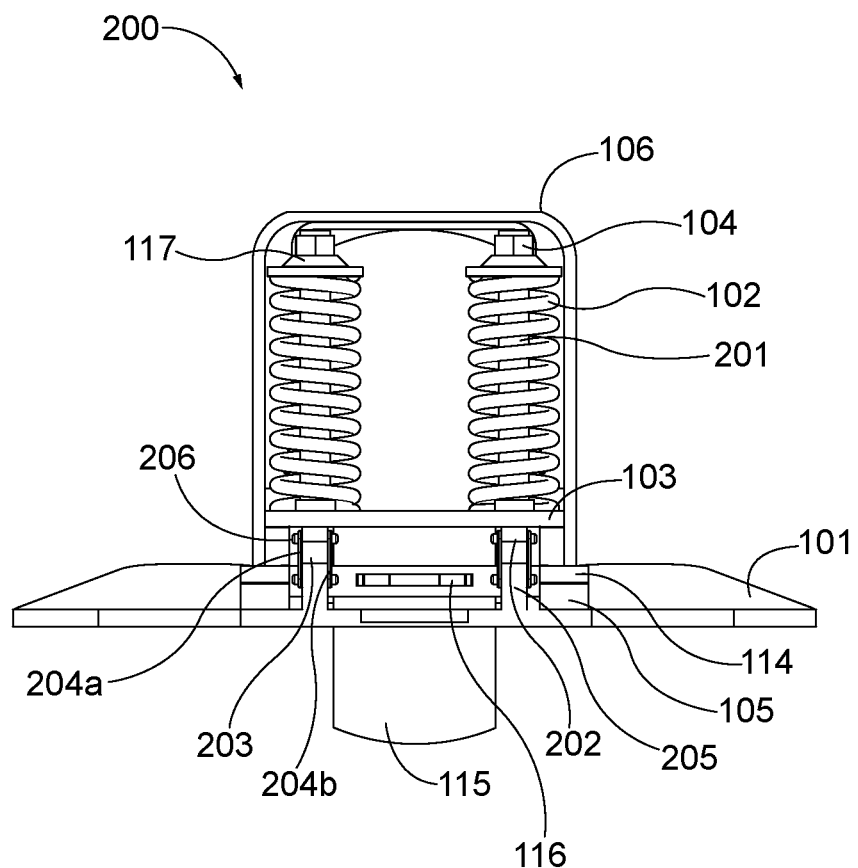
FIG. 2 illustrates a rear view of a sulky 100 of FIG. 1 more particularly illustrating a suspension system 200 of the present invention. In this embodiment, the suspension system 200 comprises two compression springs 102 each surrounding a spring shaft 201 receivable within a flange bushing 202 comprising an upper flange resting on a crossbeam support 103 and lower portion situated vertically above a connecting block 205 separated therefrom by an air gap 203. The flange bushing 202 and connecting block 205 are connected via a master link comprising an outer master link assembly 204a, inner master link assembly 204b, and master link pins 206 extending through the inner and outer master link assemblies and secured in place.

Turning now to FIG. 2, a rear view of a sulky of the present invention is shown in particular to better illustrate the construction of a suspension system 200 of the present invention. In this embodiment, and not by way of limitation, a suspension system 200 comprises two compression springs 102 held in place over a crossbeam support 103 by a washer 117 and spring nut 104, the spring nut 104 capable of threading over a threaded upper end of a spring shaft 201. Flange bushings 202 are inserted into holes in the crossbeam support 103 and a lower portion of each spring shaft 201 is inserted therethrough. Each flange bushing 202 and spring shaft 201 is connected in place directly above a connecting block 205 with an air gap 203 separating the connecting block 205 and spring shaft 201 within the flange bushing 202 to allow space for vertical oscillations as the sulky moves along behind a connected self-propelled machine.

Each flange bushing 202 receives a spring shaft 201, the flange bushing 202 and spring shaft 201 combination being held in connection with a corresponding connecting block 205 using a master link assembly comprising an outer master link assembly 204a, inner master link assembly 204b and two master link pins 206. One of ordinary skill in the art will appreciate that a master link assembly such as those used as master links for motorcycle chains or equivalent may serve as appropriate means for connecting a flange bushing 202 and spring shaft 201 combination such as that of the present invention above a corresponding connecting block 205 to enable vertical oscillations to occur via air gaps 203 while maintaining the overall integrity of the suspension system 200.

Figure 3:
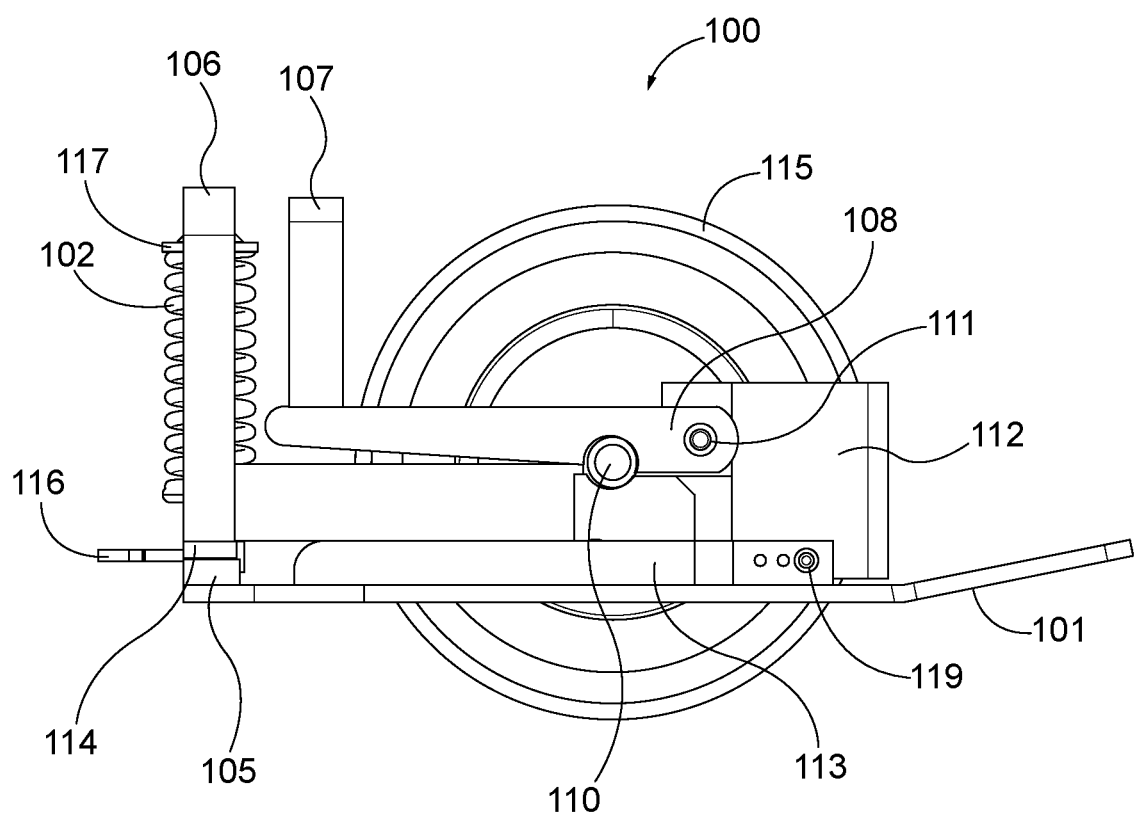
FIG. 3 illustrates a side view of a sulky 100 of the present disclosure showing the suspension system at loading condition, the pivot flange pin 119 set at the forward position (minimum loading condition).
Figure 4:
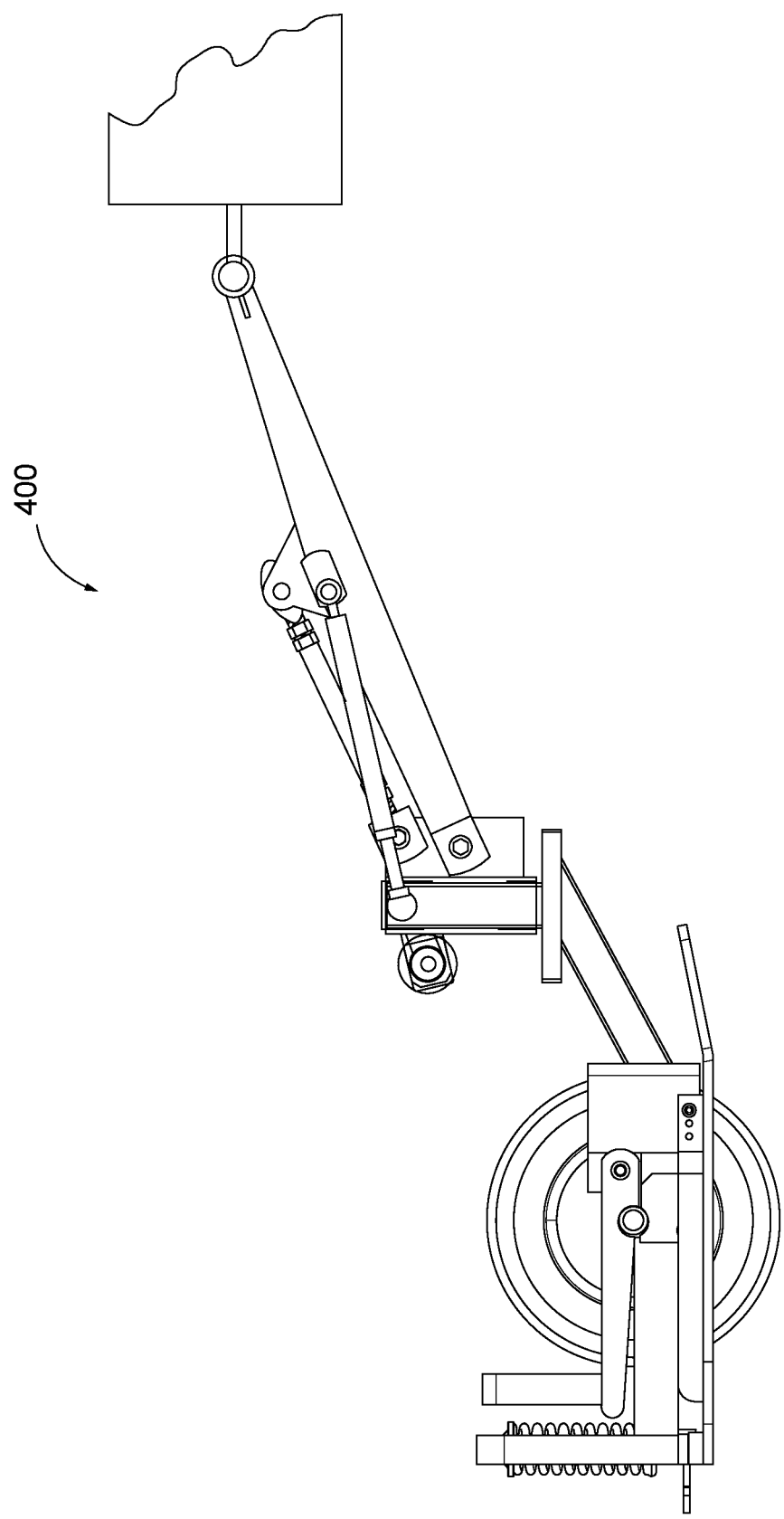
FIG. 4 illustrates a connected view 400 of a floating sulky apparatus 100 of the present disclosure (as shown in FIG. 3 from side view) pivotally connected to a self-propelled, operator-controlled machine.
Figure 5:
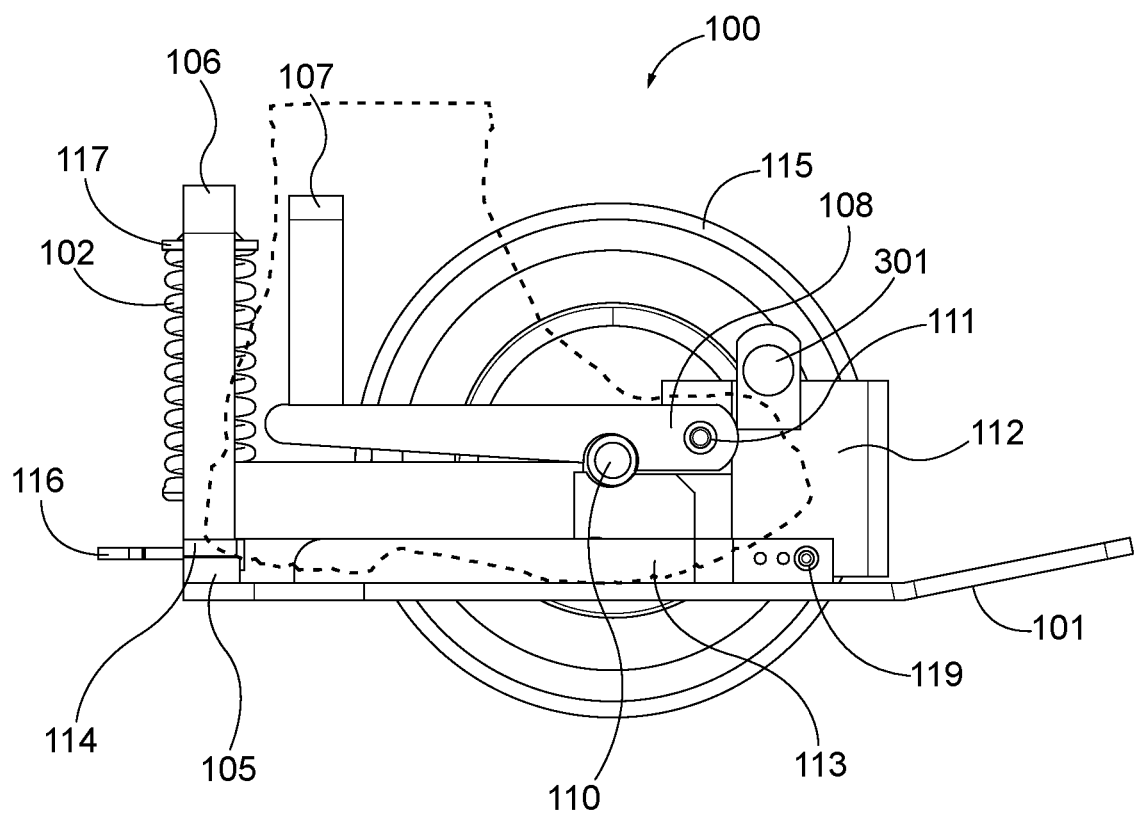
FIG. 5 illustrates a side view of a sulky 100 as depicted in FIG. 3, further comprising at least one boot peg 301 for holding a rider of the sulky in position on the riding platform 101 when a foot of the rider (illustrated in dashed lines) is positioned beneath the boot peg. Ideally at least one boot peg 301 may be present on each side of the sulky 100.

Turning now to FIG. 3, a side view of a sulky 100 of the present disclosure is provided. One of ordinary skill in the art will appreciate how the selection of a pivot flange pinhole for insertion of a pivot flange pin 119 enables the user to adjust the pivot flange 113 forward or rearward to determine the load the suspension system must bear. As shown, the pivot flange 113 is positioned such that the suspension system is bearing the minimum load the sulky 100 shown is capable of bearing. The rubber bumper 105 and bumper flange 114 allow for oscillation of the riding platform 101 vertically when the sulky 100 is in use while maintaining the position of the archway support 106 relative to the compression springs 102 and other components within. The embodiment as shown in FIG. 3 is then shown in a connected view 400 in FIG. 4, where a sulky is connected to a self-propelled machine in a use environment, and again in FIG. 5 with the inclusion of at least one boot peg 301 to aid prevention of a sulky rider being thrown from the sulky riding platform 101. The rider may insert his or her feet (see dashed line representing a boot outline of a rider) beneath a boot peg 301 on each side of the sulky, for example, and be prevented from falling backward.

One of ordinary skill in the art will appreciate that materials used in construction of a sulky 100 of the present invention may be selected based on considerations such as weight, density, durability and other physical characteristics. In particular a compression spring 102 of the present invention may be selected from spring-tempered steel die springs, nitrogen gas springs and other springs capable of bearing an operator load while the sulky is in operation. Spring rates ranging from 500 up to 1,000 pounds per square inch may provide for an appropriate range of operability in use with the present invention. Compression springs for use with the present invention may have hole diameters (Dh) of one to 0.5 to 0.625 inches, inclusive, for example, to allow for insertion of spring shafts 201 of appropriate diameter for use in the present invention.

The preceding examples are offered by way of example and not limitation. Any compression spring of suitable size capable of use as a means for dampening vertical oscillations of a riding platform of the present disclosure with an operator riding thereon will suffice. Spring lengths at minimum and maximum load may be selected based on the height of an archway support 106 and length of a spring shaft 201 of the present disclosure in its various embodiments.

One of ordinary skill in the art will also appreciate that a master link assembly comprising an outer master link assembly 204a and inner master link assembly 204b of the present invention may be of durable material such as treated steel with a roller chain trade size of 40, a pitch of 0.5 inches, a roller diameter of 0.312 inches, a roller width of 5/16" and a working load of approaching 1,000 pounds, comprising two master link pins 206 as connecting links. This embodiment of a master link assembly is offered by way of example and not limitation.

It is an object of the present invention to provide a sulky riding platform suspension system that prevents protects the body of the sulky operator against unnecessary wear. It is a further object of the present invention to provide a sulky riding platform suspension system that allows sulky operator to operate the sulky for a much longer time than if the sulky operator were on a sulky riding platform without the sulky riding platform suspension system. It is a further object of the present invention to provide a sulky riding platform suspension system to do a better grass cutting job than if the sulky operator were on a sulky riding platform without the sulky riding platform suspension system when operating a connected self-propelled lawn mower. It is a further object of the present invention to provide a sulky riding platform suspension system for a sulky that results in less wear and damage to the sulky's parts than a sulky riding platform without the sulky riding platform suspension system. It is a further object of the invention to provide the user with the option of at least three possible forward riding platform pivot flange pinholes with three possible forwardly oriented positions available for the user. One of ordinary skill in the art will appreciate that the size and construction of a sulky of the present invention and its components may be selected based on the target application, and the examples provided in this disclosure do not necessarily serve as limitations to the scope of the invention of the present disclosure.

What is claimed is:

1. A sulky apparatus comprising a riding platform having a wheel well and suspension system, wherein:
    the wheel well comprises a front wall and two side walls, each side wall being connected to an axle release arm at a pivot point of the axle release arm, each axle release arm having an axle joint capable of receiving one end of a wheel axle, each axle release arm being connected to an axle release lever;
    each side wall comprises a wheel well pinhole capable of receiving a pivot flange pin inserted through a pivot flange pinhole, the pivot flange pin capable of being held in place with a securement means inside the wheel well; and
    the pivot flange is connected to the suspension system via a side support member, the suspension system having:
        an archway support with two vertical posts inserted downwardly through corresponding bumper flanges and resting atop a corresponding rubber bumper of the riding platform, each vertical post being connected to a side support member extending forwardly from the corresponding vertical post; and
        at least one compression spring supported above a crossbeam disposed horizontally connected between the two vertical posts, each compression spring surrounding a spring shaft having a threaded upper end and a lower end, the lower end being held through the crossbeam within a flanged bushing by a master link assembly comprising a master link pin inserted horizontally through the flanged bushing and lower end beneath the crossbeam and held in place at an upper end of each of an outer master link assembly and an inner master link assembly, wherein the outer master link assembly and inner master link assembly extend downward from opposite outer sides of the flanged bushing, wherein a spring length of the at least one compression spring is adjustable by introducing at least one washer above the at least one compression spring and threading at least one spring nut around the threaded upper end of the corresponding spring shaft above the at least one washer;
    wherein the outer master link assembly and inner master link assembly each further comprise a lower end extending upward from opposite sides of a connecting block of the riding platform, wherein a master link pin extends though the lower end of the outer master link assembly, inner master link assembly and connecting block between, thereby holding each flanged bushing in place vertically above a corresponding connecting block;
    wherein the pivot flange is adjusted in the forward or rearward direction of the riding platform by selecting a pivot flange pinhole for insertion of a pivot flange pin, the pivot flange having at least two pivot flange pinholes, wherein the load borne by the suspension system is increased or decreased by selection of the pivot flange pinhole for insertion of the pivot flange pin.

2. The sulky apparatus of claim 1, wherein the suspension system is capable of dampening oscillations of the riding platform in primarily a vertical direction when the sulky apparatus is pulled over terrain behind a self-propelled machine.

3. The sulky apparatus of claim 2, wherein the suspension system absorbs energy that would be transferred to a rider of the sulky apparatus if the suspension system were not present.

4. The sulky apparatus of claim 3, further comprising a tarp tow.

5. The sulky apparatus of claim 3, further comprising a boot peg affixed to the two side walls of the wheel well, wherein a rider of the sulky apparatus may position his or her feet under the boot pegs to prevent the rider from falling backward from the riding platform.

* * * * *